(12) United States Patent
Szymanski et al.

(10) Patent No.: US 11,874,394 B2
(45) Date of Patent: Jan. 16, 2024

(54) SYSTEM AND METHOD FOR IMPROVING SIGNAL QUALIFICATION

(71) Applicant: Rockwell Collins, Inc., Cedar Rapids, IA (US)

(72) Inventors: Anthony Szymanski, Lucas, TX (US); Clint W. McLaughlin, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 84 days.

(21) Appl. No.: 17/196,435

(22) Filed: Mar. 9, 2021

(65) Prior Publication Data

US 2021/0311163 A1 Oct. 7, 2021

Related U.S. Application Data

(60) Provisional application No. 63/004,223, filed on Apr. 2, 2020.

(51) Int. Cl.
*G01S 7/292* (2006.01)
*G01S 7/41* (2006.01)
(Continued)

(52) U.S. Cl.
CPC ............ *G01S 7/2927* (2013.01); *G01S 7/414* (2013.01); *G01S 13/5244* (2013.01); *H04B 17/345* (2015.01)

(58) Field of Classification Search
CPC .... G01S 7/2927; G01S 7/414; G01S 13/5244; G01S 7/4873; H04B 17/345
See application file for complete search history.

(56) References Cited

U.S. PATENT DOCUMENTS 4,729,045 A 3/1988 Baugh
4,771,188 A * 9/1988 Cheng .............. G11B 20/10009
327/60

(Continued)

FOREIGN PATENT DOCUMENTS

EP 0284280 A1 9/1988
EP 1940140 A1 7/2008
WO WO-2014144838 A1 * 9/2014 ............ G01R 23/16

OTHER PUBLICATIONS

Rockwell Collins "DPAU-4001 Digital Pulse Analyzer Unit", BUS Copyright 2011, Rockwell Collins, Inc. dpau-4001-ds.pdf (marlboroughcomms.com.

*Primary Examiner* — Bernarr E Gregory
*Assistant Examiner* — Kenneth W Good
(74) *Attorney, Agent, or Firm* — Suiter Swantz pc llo

(57) ABSTRACT

A system may include a processor configured to: receive ambient data from an environment; calculate an average amplitude of the ambient data as a measure of a noise floor; receive a signal of interest found by the signal exceeding a noise riding threshold, the noise riding floor being an upward offset from the noise floor; calculate a running average for amplitude and frequency of the signal of interest; calculate a running variance for the amplitude and the frequency of the signal of interest; use the running average and the running variance to provide an adjustment to limits for modulation detection; use an offset from the noise riding threshold to provide a signal qualification minimum amplitude; and qualify the signal of interest based at least on the signal qualification minimum amplitude.

14 Claims, 6 Drawing Sheets

(51) Int. Cl.
*G01S 13/524* (2006.01)
*H04B 17/345* (2015.01)

(56) References Cited

U.S. PATENT DOCUMENTS

| | | | |
|---|---|---|---|
| 4,860,013 A | | 8/1989 | Huntley |
| 5,280,289 A | | 1/1994 | Root |
| 5,287,227 A | | 2/1994 | Cronch et al. |
| 5,451,956 A | | 9/1995 | Lochhead |
| 5,497,111 A | | 3/1996 | Cunningham |
| 5,514,977 A | | 5/1996 | Agiman |
| 5,687,156 A | | 11/1997 | Hurst, Jr. |
| 6,134,430 A | * | 10/2000 | Younis ............... H04B 1/109 455/340 |
| 6,433,730 B1 | | 8/2002 | Borla |
| 9,116,244 B1 | * | 8/2015 | West ............... G01S 7/414 |
| 2003/0174088 A1 | * | 9/2003 | Dizaji ............... G01S 13/5244 342/107 |
| 2005/0254593 A1 | * | 11/2005 | Moser ............... H04B 1/123 375/295 |
| 2009/0085797 A1 | * | 4/2009 | Wise ............... G01S 7/414 342/189 |
| 2009/0109083 A1 | * | 4/2009 | Tietjen ............... G01S 13/5246 342/162 |
| 2010/0238785 A1 | | 9/2010 | Hobbel |
| 2016/0127537 A1 | | 5/2016 | Krinsky et al. |

\* cited by examiner

SYSTEM AND METHOD FOR IMPROVING SIGNAL QUALIFICATION

CROSS-REFERENCE TO RELATED APPLICATIONS

The present application is related to and claims priority from: U.S. Application Ser. No. 63/004,223, titled SYSTEM AND METHOD FOR IMPROVING SIGNAL QUALIFICATION, filed Apr. 2, 2020. U.S. Application Ser. No. 63/004,223 is herein incorporated by reference in its entirety.

BACKGROUND

Characterization of signals in order to classify the signals often relies on variations in amplitude, frequency, and phase to identify signals and emitters. These collections are often compared to fixed thresholds to identify and characterize signals.

When identifying and classifying signals, variations in amplitude, frequency, phase, and other characteristics may be used to determine modulation and other characteristics of emitters. When comparing these variations to a fixed threshold, there is a desire to allow accurate classification of signals with a high signal to noise ratio (SNR) while also avoiding flagging too many false positives as signals get more corrupted by noise near the noise floor of the system and environment.

SUMMARY

In one aspect, embodiments of the inventive concepts disclosed herein are directed to a system. The system may include system may include a processor configured to: receive ambient data from an environment; calculate an average amplitude of the ambient data as a measure of a noise floor; receive a signal of interest found by the signal exceeding a noise riding threshold, the noise riding floor being an upward offset from the noise floor; calculate a running average for amplitude and frequency of the signal of interest; calculate a running variance for the amplitude and the frequency of the signal of interest; use the running average and the running variance to provide an adjustment to limits for modulation detection; use an offset from the noise riding threshold to provide a signal qualification minimum amplitude; and qualify the signal of interest based at least on the signal qualification minimum amplitude.

In a further aspect, embodiments of the inventive concepts disclosed herein are directed to a method. The method may include: receiving, by a processor, ambient data from an environment; calculating, by the processor, an average amplitude of the ambient data as a measure of a noise floor; receiving, by the processor, a signal of interest found by the signal exceeding a noise riding threshold, the noise riding floor being offset from the noise floor; calculating, by the processor, a running average for amplitude and frequency of the signal of interest; calculating, by the processor, a running variance for the amplitude and the frequency of the signal of interest; using, by the processor, the running average and the running variance to provide an adjustment to limits for modulation detection; using, by the processor, an offset from the noise riding threshold to provide a signal qualification minimum amplitude; and qualifying, by the processor, the signal of interest based at least on the signal qualification minimum amplitude.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
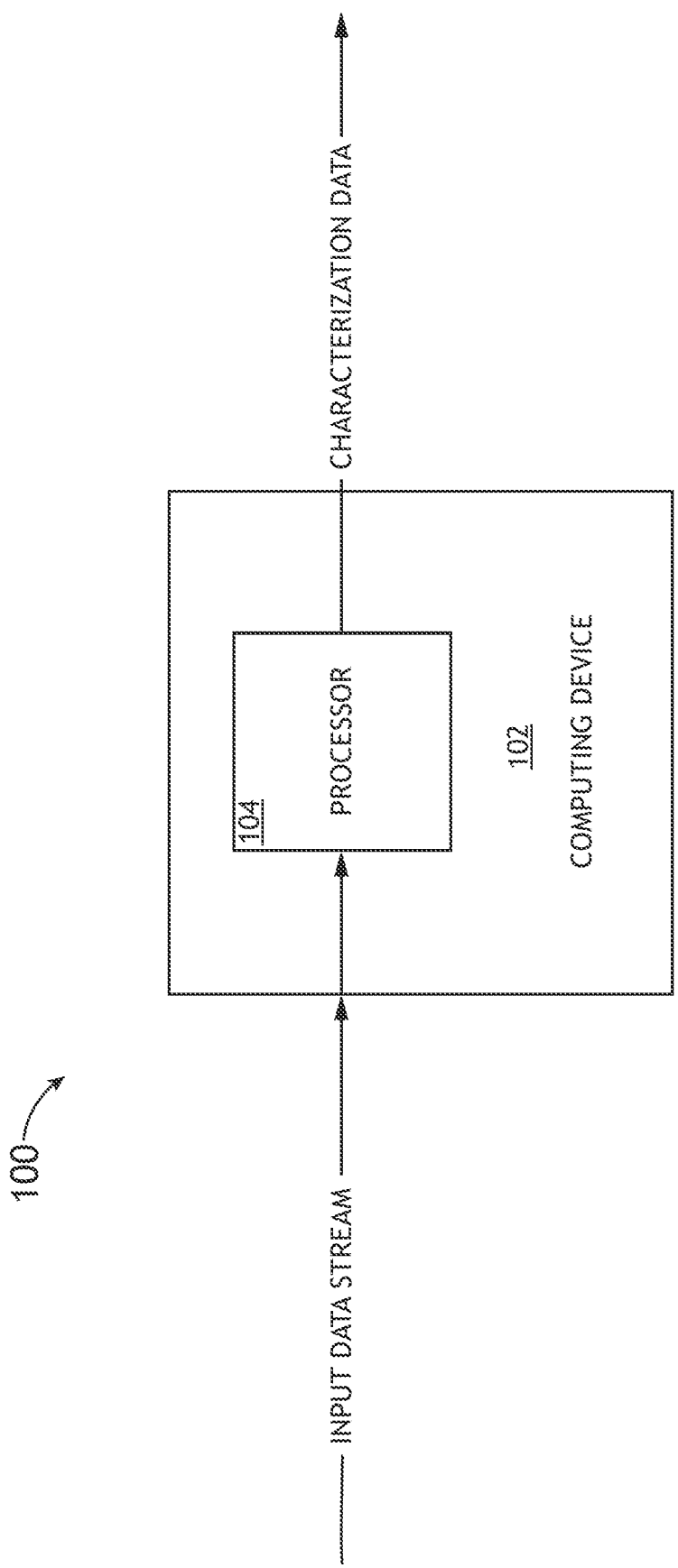
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a processor configured to use an offset from a noise riding threshold to provide a signal qualification minimum amplitude and to qualify signals based on the signal qualification minimum amplitude. Some embodiments may include use of real time data available in a signal as the signal is received to adjust thresholds for processing and characterization of the signal.

Some embodiments may include a system and a method for adaptively adjusting thresholds and for monitoring signal characteristics that can improve signal and emitter identification, as well as help an operator or system collect more meaningful data even as signals get closer to a noise floor presented by the system and environment.

In some embodiments, utilizing characteristics of the signal as the signal is captured to dynamically adjust thresholds and improve measurement of parameters can result in higher quality collections that can better identify and characterize emitters.

As used throughout, signal qualification may refer to a process of determining which signals to keep (e.g., for downstream processing) and which signals to eliminate and/or ignore based on various criteria such as amplitude, frequency, and/or any other measurable signal characteristic. By using signal qualification parameters, unwanted signals can be discarded prior to any downstream processing.

As used throughout, noise floor may refer to an average amplitude of the signal environment in the absence of a signal.

As used throughout, a noise riding threshold (NRT) may refer to a signal threshold that is set as an offset from the noise floor such that signals should exceed the noise floor by at least the amount specified by the offset to trigger processing.

Figure 2:
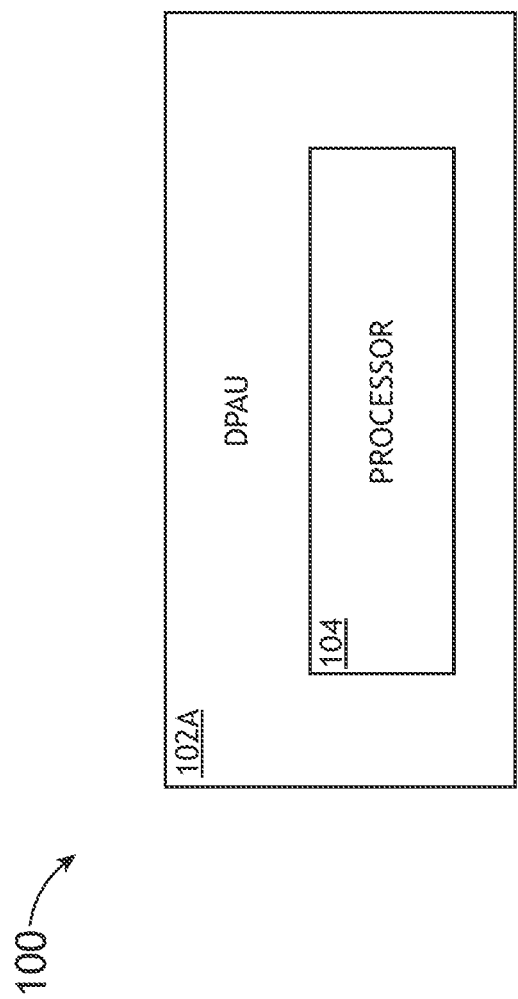
FIG. 2 is an exemplary embodiment of the computing device of the system of FIG. 1 as a digital pulse analyzer unit (DPAU) according to the inventive concepts disclosed herein.

Referring now to FIGS. 1-2, exemplary embodiments of a system 100 according to the inventive concepts disclosed herein is depicted. The system 100 may be implemented as any suitable system, such as at least one vehicle system (e.g., at least one aircraft, at least one watercraft, at least one submersible craft, at least one automobile, and/or at least one train), a computing device system, and/or a multiple computing device system. For example, as shown in FIG. 1, the system 100 may include at least one computing device 102.

For example, the computing device 102 may be configured to receive signals and/or data from a source (e.g., at least one other computing device 102, at least one sensor, and/or at least one radiofrequency (RF) emitter). In an exemplary embodiment shown in FIG. 2, the computing device 102 may be a digital pulse analyzer unit (DPAU) 102A configured to analyze radar pulse signals of interest received from radar emitters. The computing device 102 may include at least one processor 104 and at least one memory, which may be communicatively coupled. The at least one processor 104 may be implemented as any suitable type and number of processors. For example, the at least one processor 104 may include at least one general purpose processor (e.g., at least one central processing unit (CPU)), at least one digital signal processor (DSP), at least one application specific integrated circuit (ASIC), at least one field-programmable gate array (FPGA), at least one complex programmable logic device (CPLD), and/or at least one graphics processing unit (GPU). The at least one processor 104 may be configured to perform (e.g., collectively perform if more than one processor) any or all of the operations disclosed throughout. The processor 104 may be configured to run various software and/or firmware applications and/or computer code stored (e.g., maintained) in a non-transitory computer-readable medium (e.g., memory) and configured to execute various instructions or operations.

For example, the processor may be configured to: receive ambient data from an environment; calculate an average amplitude of the ambient data as a measure of a noise floor; receive a signal of interest found by the signal exceeding a noise riding threshold, the noise riding floor being an upward offset from the noise floor; calculate a running average for amplitude and frequency of the signal of interest; calculate a running variance for the amplitude and the frequency of the signal of interest; use the running average and the running variance to provide an adjustment to limits for modulation detection (e.g., wherein the adjustment to the limits for the modulation detection may reduce a number of false positive detections); use an offset from the noise riding threshold to provide a signal qualification minimum amplitude (e.g., wherein signals with amplitude below the signal qualification minimum amplitude may be ignored and/or eliminated); qualify signals based at least on the signal qualification minimum amplitude; output qualified signals for processing; and/or process qualified signals and output data based at least on processed qualified signals.

Figure 3:
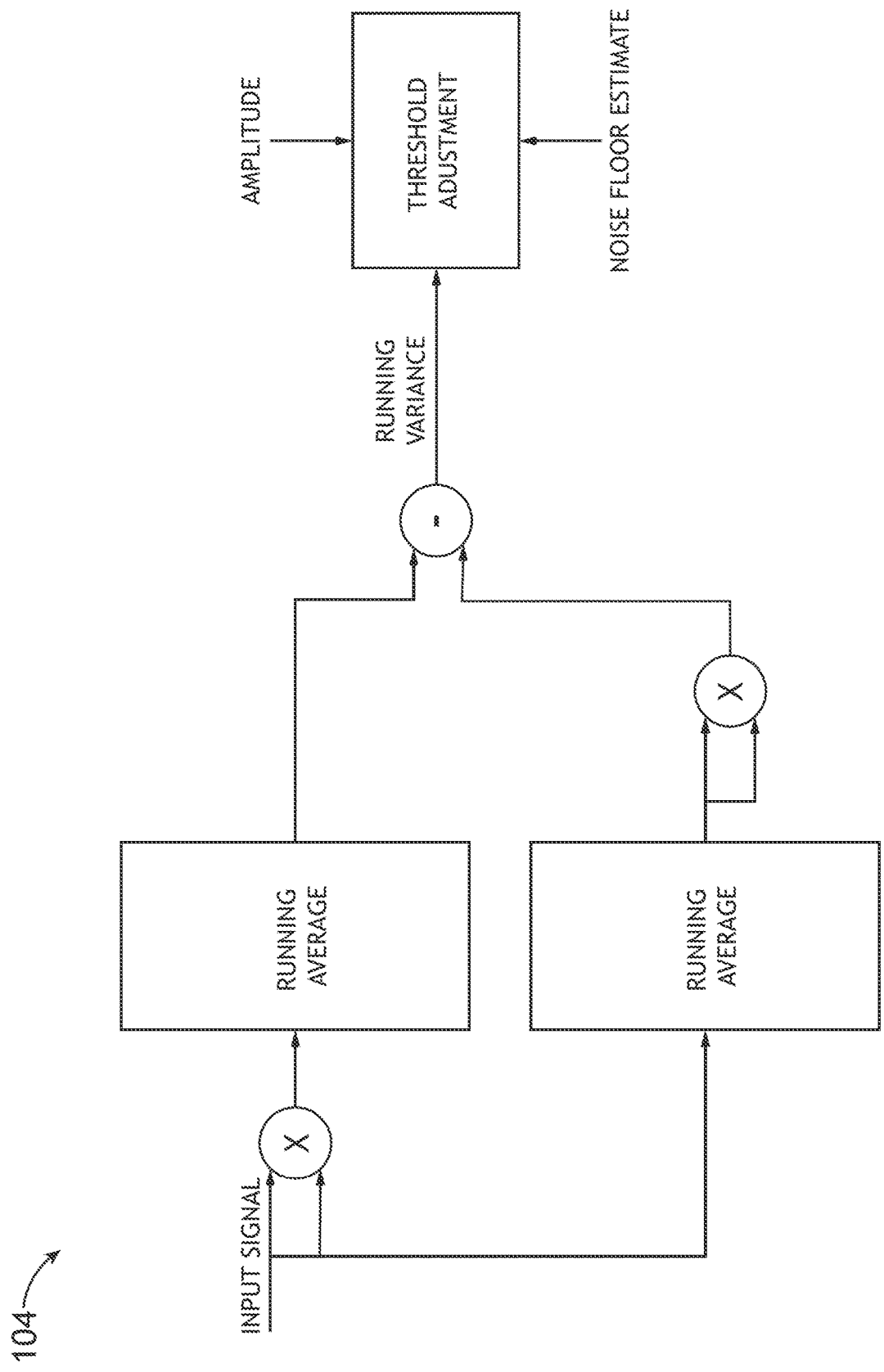
FIG. 3 is an exemplary flow diagram of operations performed by the processor of the computing device of the system of FIG. 1 according to the inventive concepts disclosed herein.

Referring now to FIG. 3, an exemplary flow diagram is shown of the processor 104 calculating the running variance by using the running average and calculating an offset from the noise riding threshold (NRT) to provide a signal qualification minimum amplitude.

In some embodiments, signal capture and characterization may rely on set tolerances to determine when a signal is present and when variation of the signal is a true signal characteristic, such as modulation, or is just noise from the environment. Currently, thresholds utilize fixed values that do not take the signal relationship to the noise floor into consideration. This can lead to tolerances that are very wide on high quality high SNR signals that might cause signal characteristics to not be captured. The limits can also simultaneously be too restrictive on signals closer to the noise floor leading to many false positives for certain characteristics. The spreading of the signal parameters is sometimes mitigated by calculating a running average on the signal by using the following equation:

$$Avg = \frac{\sum_{x=1}^{n} Input_x}{n} - \frac{Input_0}{n}$$

Additionally, the running average may be calculated according to the below equation, where y is the sample number, n is the number of samples included in the running average, and x is the summation index:

$$Avg_y = \frac{\sum_{x=y-n+1}^{y} Input_x}{n} - \frac{Input_{y-n}}{n}$$

As long as n is a power of 2, the division may be done by shifting the values to the right $\log_2(n)$ bits.

Averaging can reduce the spread in the graphing of individual signals and improve the collections so that the collected signals are more precise on measuring the actual frequency and amplitude of the emitter, but will mask sudden signal changes that might indicate modulation or other information.

Capturing a running average that varies as the signal detection length increases, may allow for better accuracy on signals that are active longer but still provide a benefit on short pulsed signals as well. The raw data can be monitored for sudden changes that might be masked by the averaging, and the averaging can be halted in the presence of such changes to prevent the loss of information but still present the user with the last valid average reducing the parameters' spread as the signal approaches the noise floor. By using these running average values, the spreading of the signal can be reduced to improve a system's and/or operator's abilities to isolate signals that may be in close proximity to one another.

Low amplitude signals may still trigger flags for characteristics utilizing a fixed threshold, such as amplitude and frequency modulations. Calculating a running variance of the signal can be done in a similar manner to the running average using a similar power of 2 methodology for n to replace the division by shifting right the appropriate number of bits as shown in the following equation:

$$Var_y = \left(\frac{\sum_{x=y-n+1}^{y} Input_x^2}{n} - \frac{Input_{y-n}^2}{n}\right) - \left(\frac{\sum_{x=y-n+1}^{y} Input_x}{n} - \frac{Input_{y-n}}{n}\right)^2$$

In some embodiments, in the interest of code reuse, a function that does a running average can be used to calculate both the running average and the running average of the input value squared. From this, the running variance equation can be simplified as shown below, which can be implemented with minimal resource impact on a processor 104:

$$Var = Avg(Input^2) - (Avg(Input))^2$$

In linear amplitude space, a same quantity of noise may result in the same variance regardless of the amplitude, which would not necessarily be useful on the amplitude scale. When the amplitude is represented in a logarithmic scale, as the amplitude is commonly represented using decibels (dB), the noise floor contribution to the signal variance may decrease as amplitude increases. This may give a parameter that can be continuously monitored along with the signal that indicates the amount that a signal is changing over a running window. This may be combined with the SNR of the signal provided through monitoring of the noise floor that is done for noise riding thresholds (NRTs) to adjust the thresholds for flagging various frequency and amplitude modulations and other signal parameters as shown in FIG. 3.

The running variance can also be used as an enhancement to pulse width calculation since the variance typically decreases through the duration of the pulse as the pulse power overtakes the noise power. This may provide the ability to capture small variations on signals with a high SNR for more accurate characterization and classification while simultaneously allowing capture of signals close to the noise floor without falsely triggering the thresholds.

Figure 4:
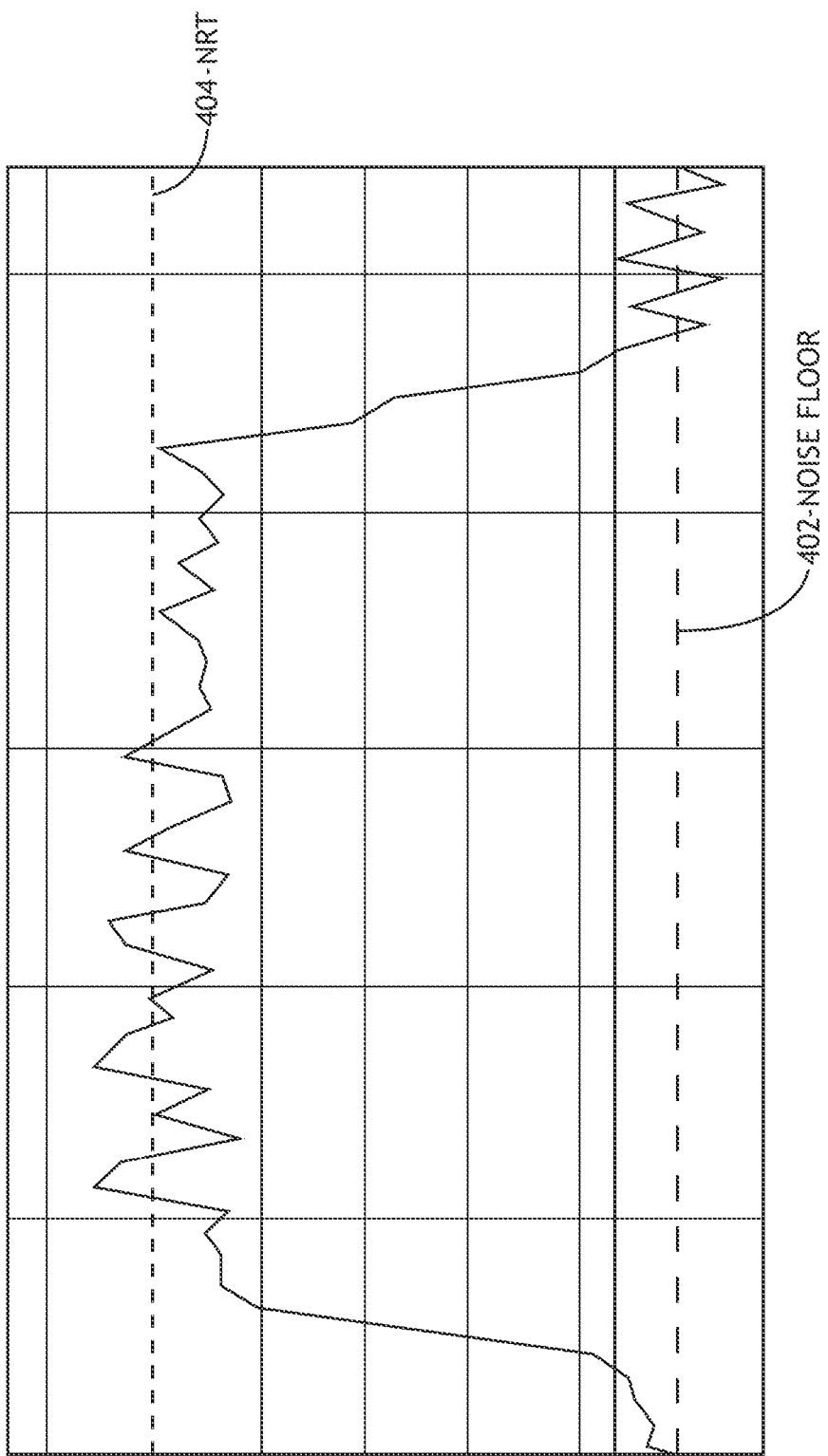
FIG. 4 is an exemplary graph of a signal of interest according to the inventive concepts disclosed herein.

The average can also be used to monitor the noise floor when signals are not present to create an NRT for detection of the presence of a signal. Signals that are located close to the NRT often have issues with capturing accurate parameters as shown in FIG. 4, which shows the noise floor 402 of the signal and the NRT 404. As can be seen, the signal does not break the NRT 404 until the signal has already been active for a while and that falling below the threshold multiple times may result in a premature end to the signal characterization processing.

Currently, some systems allow for a fixed amplitude qualification level that can be adjusted by the user to help avoid capturing near the NRT 404 and for signal isolation. This fixed amplitude qualification level has to be manually adjusted when the noise floor changes. If the qualification level is set too high, then signals that might contain good information will not be captured. If the qualification level is set too low, then many signals existing at the threshold will be captured with parameters that might not be accurate. Currently, in an automatic system where minimal user interaction is present, the threshold may not be responsive to the environment and over the span of a system run, valuable data may be missed and inaccurate data may be captured.

Figure 5:
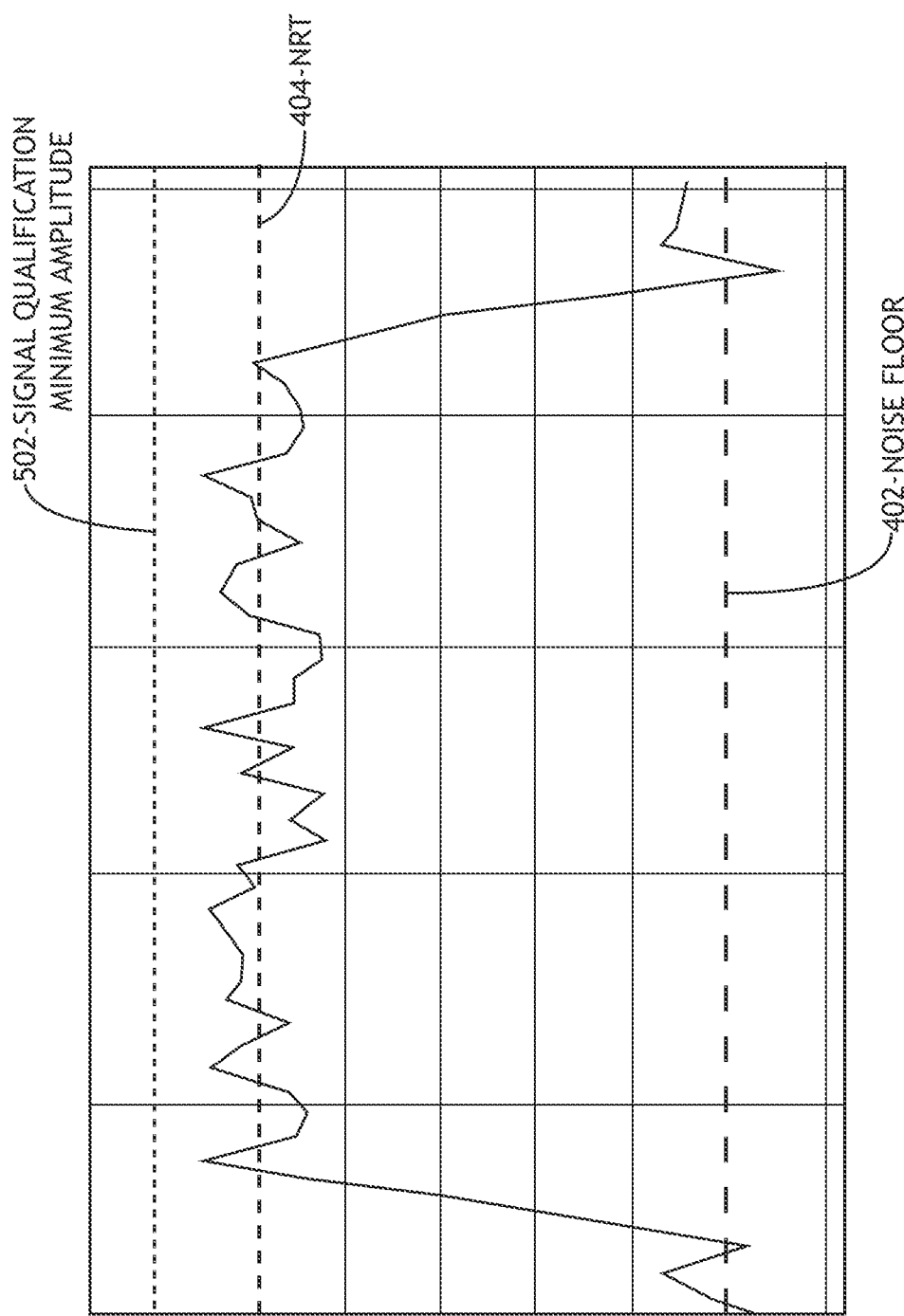
FIG. 5 is an exemplary graph of a signal of interest according to the inventive concepts disclosed herein.

Referring now to FIG. 5, some embodiments may include a system and a method for improving collections of the signals that may include creating a secondary level (e.g., a signal qualification minimum amplitude 502) offset from the threshold by a fixed amount, so that as the noise floor 402 in the system changes, the signal qualification minimum amplitude 502 moves with the NRT 404 and the noise floor 402.

By setting this signal qualification minimum amplitude 502 as an offset from the NRT 404, only signals that exceed the threshold by a set amount should be captured, which may ensure that the measured signal parameters are higher in quality. This can be done with a register in the processor 104. Software executed by the processor 104 may allow for user adjustment of the offset value so that the system 100 can be optimized to the operator's preferences.

Additionally, this offset may enhance automatic modes by providing consistent signal qualification that automatically adjusts to the environment without requiring human intervention. This also may benefit manual operation that would allow even setting manual thresholds that would automatically adjust the signal qualification minimum amplitude 502, which may eliminate an extra step for a human operator to adjust a fixed manual qualification level.

By implementing signal averaging, variance monitoring, and threshold offsets, a system can improve signal collection and characterization quality while simultaneously simplifying the user interface for both manual and automatic signal collections.

Figure 6:
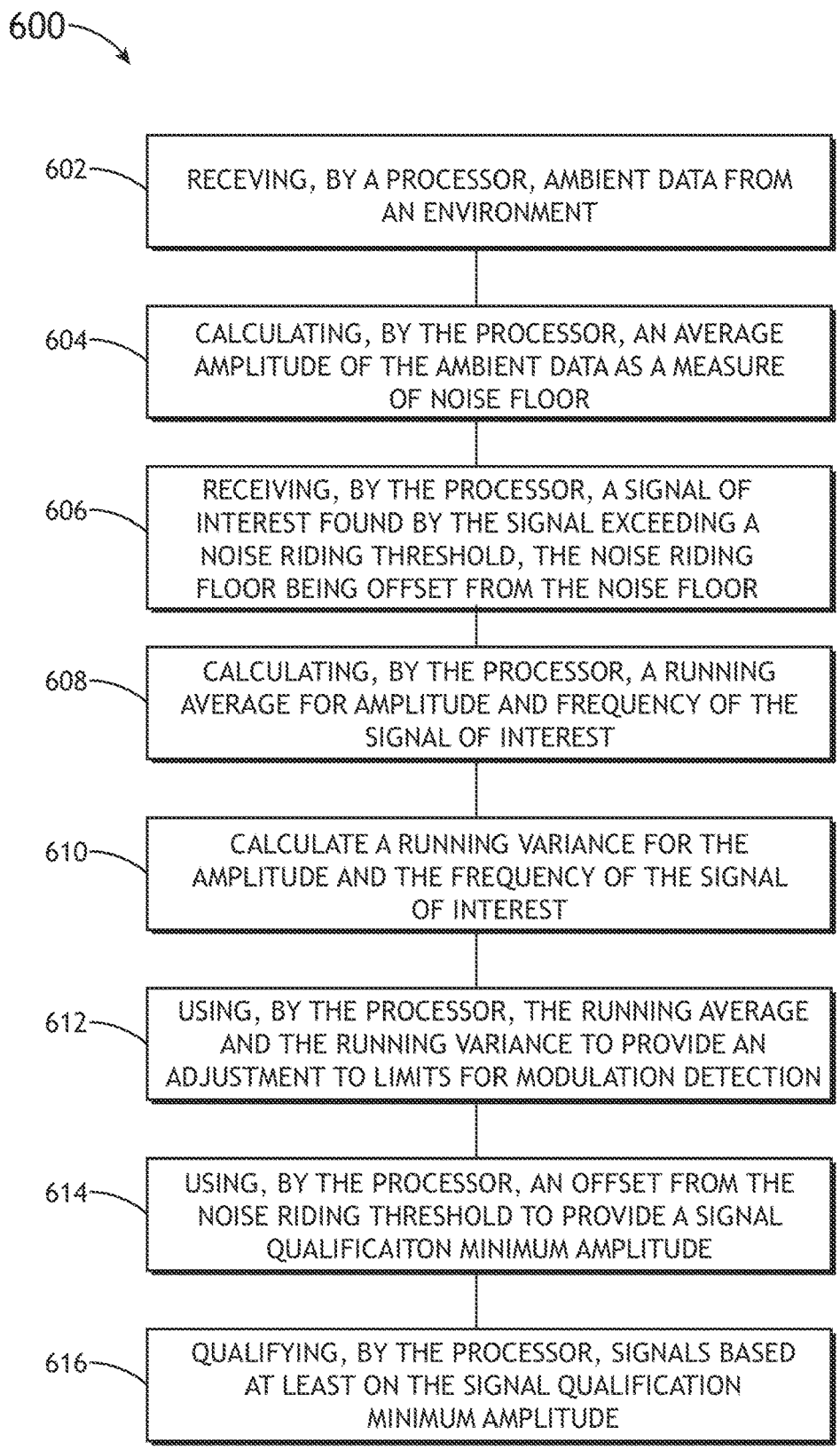
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include receiving, by a processor, ambient data from an environment.

A step 604 may include calculating, by the processor, an average amplitude of the ambient data as a measure of a noise floor.

A step 606 may include receiving, by the processor, a signal of interest found by the signal exceeding a noise riding threshold, the noise riding floor being offset from the noise floor.

A step 608 may include calculating, by the processor, a running average for amplitude and frequency of the signal of interest.

A step 610 may include calculating, by the processor, a running variance for the amplitude and the frequency of the signal of interest.

A step 612 may include using, by the processor, the running average and the running variance to provide an adjustment to limits for modulation detection.

A step 614 may include using, by the processor, an offset from the noise riding threshold to provide a signal qualification minimum amplitude.

A step 616 may include qualifying, by the processor, signals based at least on the signal qualification minimum amplitude.

Further, the method 600 may include any of the operations disclosed throughout.

As will be appreciated from the above, embodiments of the inventive concepts disclosed herein may be directed to a method and a system including a processor configured to use an offset from a noise riding threshold to provide a signal qualification minimum amplitude and to qualify signals based on the signal qualification minimum amplitude.

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a digital pulse analyzer unit (DPAU), the DPAU comprising at least one processor, the at least one processor configured to:
receive ambient data from an environment;
calculate an average amplitude of the ambient data as a measure of a noise floor;
receive a signal of interest found by the signal of interest exceeding a noise riding threshold, the noise riding threshold being an upward offset from the noise floor;
calculate a running average for amplitude and frequency of the signal of interest;
calculate a running variance for the amplitude and the frequency of the signal of interest;
use the running average and the running variance to provide an adjustment to limits for modulation detection;

use an offset from the noise riding threshold to provide a signal qualification minimum amplitude;
qualify the signal of interest based at least on the signal qualification minimum amplitude;
create a secondary signal qualification minimum amplitude, in addition to, and upwardly offset from the noise riding threshold, wherein the secondary signal qualification minimum amplitude results in signals with a higher signal to noise ratio than the signal qualification minimum amplitude;
adjust the secondary signal qualification minimum amplitude, wherein as the noise floor changes the secondary signal qualification minimum amplitude moves with the noise riding threshold and the noise floor; and
qualify a second signal of interest based at least on the secondary signal qualification minimum amplitude.

2. The system of claim 1, wherein the processor is further configured to output the qualified signal for processing.

3. The system of claim 1, wherein the processor is further configured to process the qualified signal and to output data based at least on the processed qualified signal.

4. The system of claim 1, wherein the adjustment to the limits for the modulation detection reduces a number of false positive detections.

5. The system of claim 1, wherein signals with amplitude below the signal qualification minimum amplitude are ignored or eliminated.

6. The system of claim 1, wherein the signal of interest is a radar signal of interest.

7. The system of claim 6, wherein the system is an aircraft system.

8. The system of claim 1, wherein the processor is a central processing unit (CPU), a digital signal processor (DSP), an application specific integrated circuit (ASIC), a field-programmable gate array (FPGA), a complex programmable logic device (CPLD), or a graphics processing unit (GPU).

9. A method, comprising:
receiving, by a processor of a digital pulse analyzer unit (DPAU), ambient data from an environment;
calculating, by the processor, an average amplitude of the ambient data as a measure of a noise floor;
receiving, by the processor, a signal of interest found by the signal of interest exceeding a noise riding threshold, the noise riding threshold being offset from the noise floor;
calculating, by the processor, a running average for amplitude and frequency of the signal of interest;
calculating, by the processor, a running variance for the amplitude and the frequency of the signal of interest;
using, by the processor, the running average and the running variance to provide an adjustment to limits for modulation detection;
using, by the processor, an offset from the noise riding threshold to provide a signal qualification minimum amplitude;
qualifying, by the processor, the signal of interest based at least on the signal qualification minimum amplitude;
creating, by the processor, a secondary signal qualification minimum amplitude in addition to and upwardly offset from the noise riding threshold, wherein the secondary signal qualification minimum amplitude results in signals with a higher signal to noise ratio than the signal qualification minimum amplitude;
adjusting the secondary signal qualification minimum amplitude, wherein as the noise floor changes the secondary signal qualification minimum amplitude moves with the noise riding threshold and the noise floor; and
qualifying, by the processor, a second signal of interest based at least on the secondary signal qualification minimum amplitude.

10. The method of claim 9, further comprising outputting, by the processor, the qualified signal for processing.

11. The method of claim 9, further comprising processing, by the processor, the qualified signal and outputting, by the processor, data based at least on the processed qualified signal.

12. The method of claim 9, wherein the adjustment to the limits for the modulation detection reduces a number of false positive detections.

13. The method of claim 9, wherein signals with amplitude below the signal qualification minimum amplitude are ignored or eliminated.

14. The method of claim 9, wherein the signal of interest is a radar signal of interest.

* * * * *